United States Patent
Bodtker et al.

(10) Patent No.: US 10,112,640 B2
(45) Date of Patent: Oct. 30, 2018

(54) STEERING COLUMN ASSEMBLY HAVING A RESTRICTION ASSEMBLY

(71) Applicant: Steering Solutions IP Holding Corporation, Saginaw, MI (US)

(72) Inventors: Joen C. Bodtker, Gaines, MI (US); Randy W. Jones, North Branch, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 185 days.

(21) Appl. No.: 15/334,640

(22) Filed: Oct. 26, 2016

(65) Prior Publication Data

US 2018/0111640 A1    Apr. 26, 2018

(51) Int. Cl.
*B62D 1/184* (2006.01)
*B62D 1/189* (2006.01)
*B62D 1/181* (2006.01)

(52) U.S. Cl.
CPC ............. *B62D 1/184* (2013.01); *B62D 1/181* (2013.01); *B62D 1/189* (2013.01)

(58) Field of Classification Search
CPC ......... B62D 1/184; B62D 1/181; B62D 1/189
See application file for complete search history.

(56) References Cited

U.S. PATENT DOCUMENTS

| | | | | |
|---|---|---|---|---|
| 7,677,133 B2 * | 3/2010 | Matsui | ................ | B62D 1/184 280/775 |
| 7,721,620 B2 * | 5/2010 | Matsui | ................ | B62D 1/184 280/775 |
| 8,327,733 B2 * | 12/2012 | Ozsoylu | ................ | B62D 1/184 280/775 |
| 9,840,269 B2 * | 12/2017 | Tanaka | ................ | B62D 1/189 |
| 2016/0176433 A1 * | 6/2016 | Okano | ................ | B62D 1/184 74/495 |
| 2017/0008545 A1 * | 1/2017 | Hong | ................ | B62D 1/187 |
| 2017/0066468 A1 * | 3/2017 | Tomiyama | ............ | B62D 1/184 |
| 2017/0274922 A1 * | 9/2017 | Uesaka | ................ | B62D 1/184 |
| 2017/0282960 A1 * | 10/2017 | Matsuno | ............... | B62D 1/189 |
| 2018/0105196 A1 * | 4/2018 | Bodtker | ................ | B62D 1/195 |
| 2018/0141581 A1 * | 5/2018 | Kato | ..................... | B62D 1/181 |
| 2018/0141582 A1 * | 5/2018 | Bodtker | ................ | B62D 1/195 |

* cited by examiner

Primary Examiner — Faye M Fleming
(74) Attorney, Agent, or Firm — Cantor ColburnLLP

(57) ABSTRACT

A steering column assembly includes a restriction assembly that is operatively connected to a jacket assembly and a mounting bracket. The restriction assembly includes a first strap and a second strap. The first strap has a pivot that extends into the mounting bracket and has a plurality of first locking teeth. The second strap is disposed transverse to the first strap. The second strap has a plurality of second locking teeth that face towards the plurality of first locking teeth and has a plurality of third locking teeth disposed opposite the plurality of second locking teeth.

20 Claims, 4 Drawing Sheets

STEERING COLUMN ASSEMBLY HAVING A RESTRICTION ASSEMBLY

BACKGROUND OF THE INVENTION

Some vehicles are provided with a steering column assembly that is telescopically and/or tilt adjustable. The steering column assembly is provided with a feature or a mechanism that maintains the steering column assembly in a fixed position for driving. The feature or mechanism incorporates locking hardware that restricts each degree of freedom of the steering column assembly.

SUMMARY OF THE INVENTION

According to an embodiment of the present disclosure, a steering column assembly is provided. The steering column assembly includes a mounting bracket, a jacket assembly, and a restriction assembly. The mounting bracket has a first arm and a second arm. The jacket assembly is movable relative to a steering column axis. The jacket assembly is operatively connected to the first arm and the second arm. The restriction assembly is operatively connected to the jacket assembly and the mounting bracket. The restriction assembly is configured to inhibit movement of the jacket assembly relative to the mounting bracket. The restriction assembly includes a first strap, a second strap, a first bracket, and a cam member. The first strap is mounted to the first arm. The first strap defines a plurality of first locking teeth. The second strap is disposed on the first arm. The second strap defines a plurality of second locking teeth arranged to selectively engage the plurality of first locking teeth. The second strap defines a plurality of third locking teeth disposed opposite the plurality of second locking teeth. The first bracket is disposed on the first arm. The cam member is pivotally connected to the first bracket. The cam member has a plurality of complementary engagement members that are configured to selectively engage the plurality of third locking teeth.

According to another embodiment of the present disclosure, a steering column assembly is provided. The steering column assembly includes a restriction assembly that is operatively connected to a jacket assembly and a mounting bracket that is operatively connected to the jacket assembly. The restriction assembly includes a first strap and a second strap. The first strap has a pivot that extends into the mounting bracket and a plurality of first locking teeth. The second strap is disposed transverse to the first strap. The second strap has a plurality of second locking teeth that face towards the plurality of first locking teeth and a plurality of third locking teeth disposed opposite the plurality of second locking teeth.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely illustrative of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
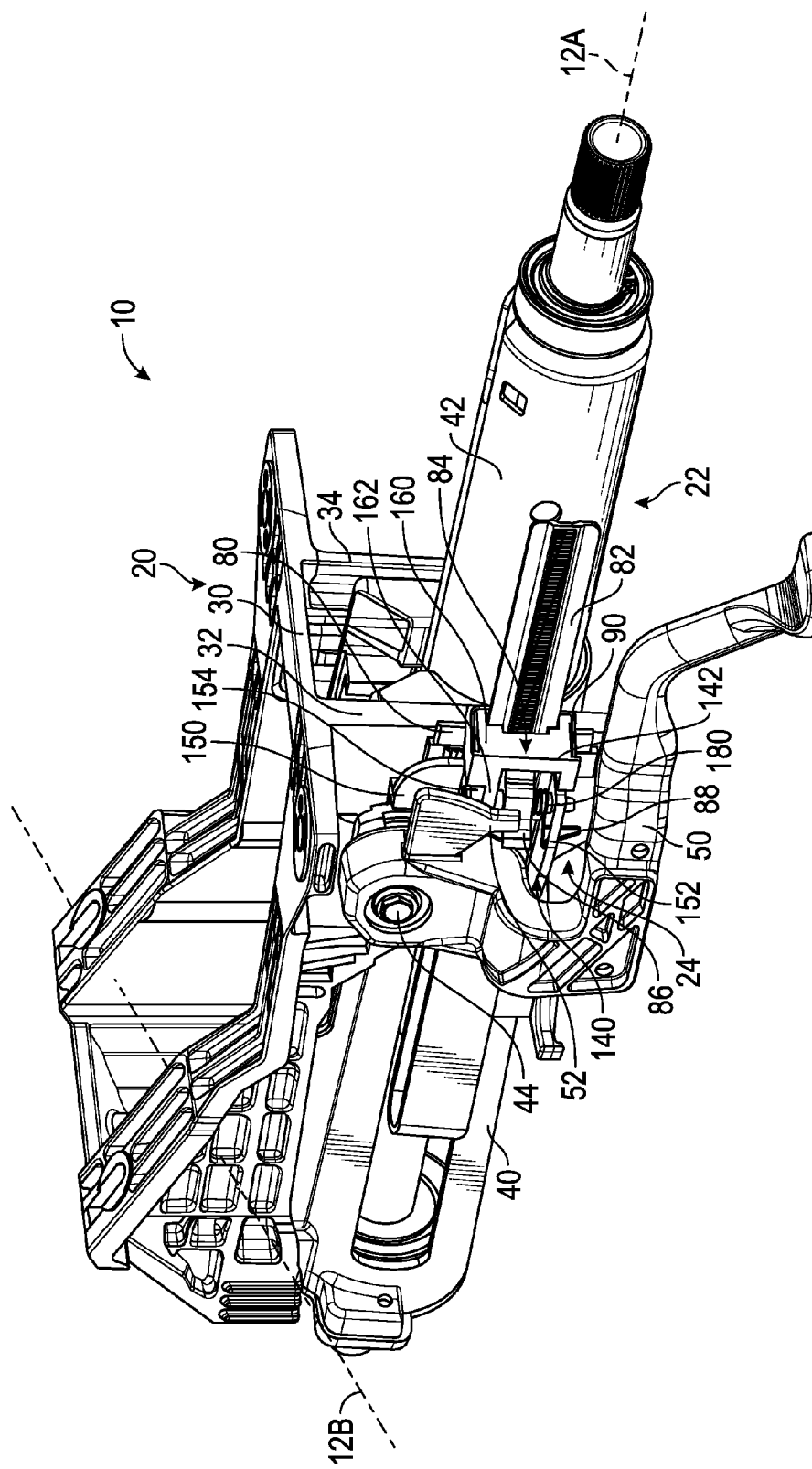
FIG. 1 is a perspective view of a steering column assembly having an adjustment lever.
Figure 2:
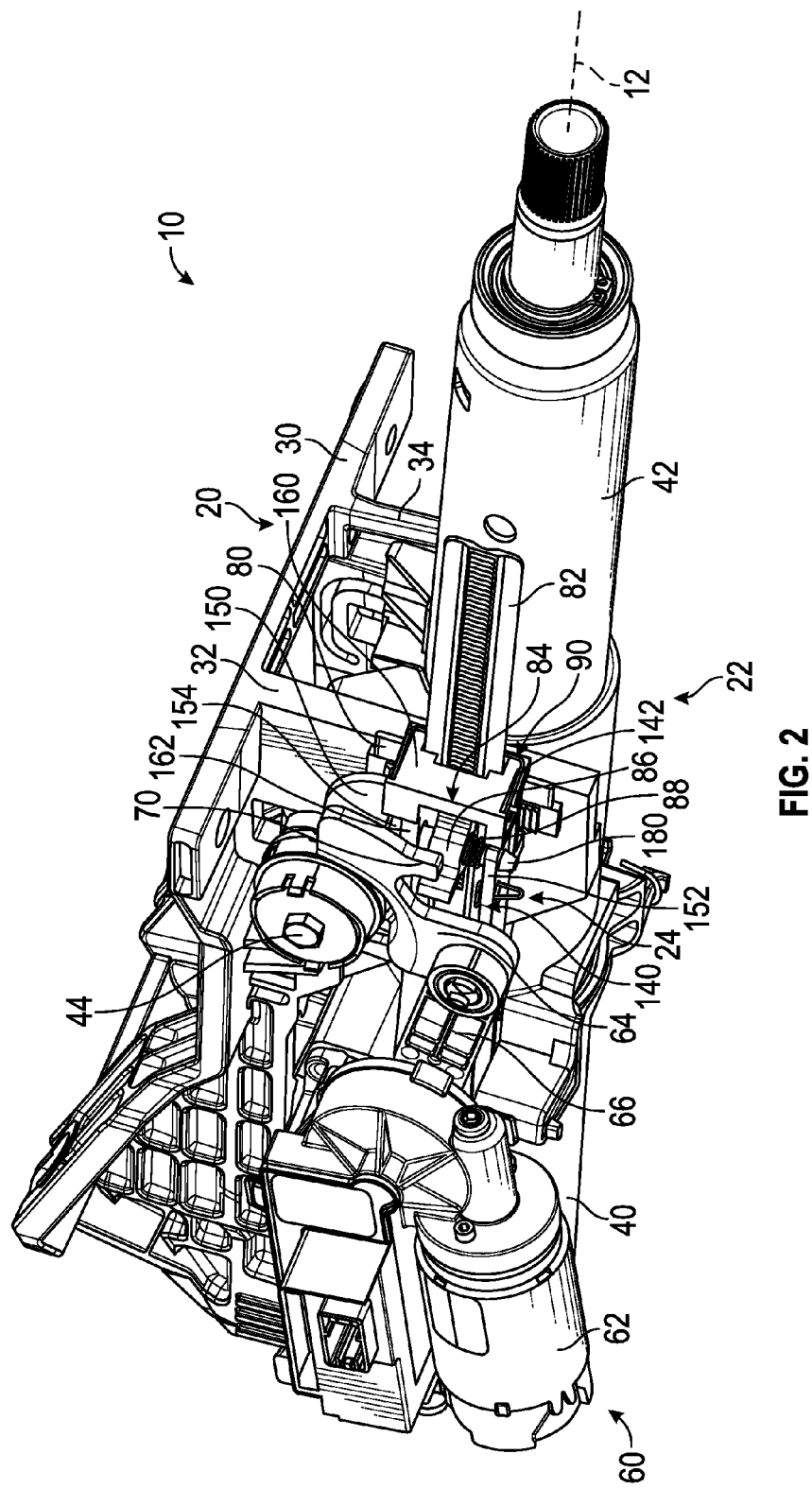
FIG. 2 is a perspective view of the steering column assembly having a column release actuator assembly.

Referring to FIGS. 1 and 2, a steering column assembly 10 is shown. The steering column assembly 10 extends along a steering column axis 12A. The steering column assembly 10 is an adjustable steering column assembly wherein at least a portion of the steering column assembly 10 is movable relative to the steering column axis 12. For example, the steering column assembly 10 translates along the steering column axis 12A and/or tilts, pivots, and rake adjusts relative to a pivot axis 12B. The steering column assembly 10 includes a mounting bracket 20, a jacket assembly 22, and a restriction assembly 24.

The mounting bracket 20 operatively connects the jacket assembly 22 to a vehicle structure. The mounting bracket 20 is configured to facilitate the adjustment of the pitch, tilt, or rake of the jacket assembly 22. The mounting bracket 20 includes a mounting bracket body 30, a first arm 32, and a second arm 34. The mounting bracket body 30 includes a generally planar portion that is disposed generally parallel to the steering column axis 12. The first arm 32 extends from and is disposed generally perpendicular to the mounting bracket body 30. The first arm 32 defines an opening 36 (see FIG. 4) that extends at least partially through the first arm 32. The second arm 34 is spaced apart from and is disposed generally parallel to the first arm 32. The second arm 34 extends from and is disposed generally perpendicular to the mounting bracket body 30.

The jacket assembly 22 is operatively connected to the mounting bracket 20. The jacket assembly 22 is disposed between the first arm 32 and the second arm 34. The jacket assembly 22 is movable relative to the steering column axis 12 and is movable relative to the mounting bracket 20. The jacket assembly 22 includes a lower jacket assembly 40 and an upper jacket assembly 42. The lower jacket assembly 40 is connected to the mounting bracket 20 by a rake bolt 44 that extends through at least one of the first arm 32 and the second arm 34 of the mounting bracket 20.

The upper jacket assembly 42 is at least partially received within the lower jacket assembly 40. The upper jacket assembly 42 is translatable along the steering column axis 12 to telescopically adjust a position of a steering wheel coupled to the upper jacket assembly 42.

The combination of the lower jacket assembly 40 and the upper jacket assembly 42 is pivotable, tiltable, or rake adjustable relative to the pivot axis 12B to perform a rake or pitch adjustment of the steering wheel coupled to the upper jacket assembly 42.

As shown in FIG. 1, an adjustment lever 50 is pivotally connected to at least one of the mounting bracket 20 and the jacket assembly 22. The adjustment lever 50 is pivotally connected to at least one of the mounting bracket 20 and the jacket assembly 22 by the rake bolt 44. The adjustment lever 50 includes a cam release feature 52.

The adjustment lever 50 is movable between a lock position and an unlock position by an operator of the vehicle. The adjustment lever 50 moves between the lock position and the unlock position about an axis that extends through the rake bolt 44. The axis is disposed transverse to the steering column axis 12. The operator of the vehicle is able to move the adjustment lever 50 from the lock position towards the unlock position to adjust a position of the steering wheel connected to the upper jacket assembly 42. The cam release feature 52 is configured to engage a portion of the restriction assembly 24 to facilitate the adjustment of the steering wheel while the adjustment lever 50 is moved between the lock position and unlock position.

As shown in FIG. 2, a column release actuator assembly 60 may be provided instead or in conjunction with the adjustment lever 50. The column release actuator assembly 60 is arranged to enable or facilitate the adjustment of a position of the steering wheel operatively connected to the upper jacket assembly 42. The column release actuator assembly 60 includes an electric motor 62, an actuator arm 64, and a link 66.

The electric motor 62 is disposed on at least one of the mounting bracket 20 and the lower jacket assembly 40. The electric motor 62 includes a drive train, a gear assembly, or the like that is driven by at least a portion of electric motor 62.

The actuator arm 64 is pivotally connected to at least one of the mounting bracket 20 and the jacket assembly 22. The actuator arm 64 is pivotally connected to at least one of the mounting bracket 20 and the jacket assembly 22 by the rake bolt 44. The actuator arm 64 includes a cam release feature 70.

The link 66 extends between the electric motor 62 and the actuator arm 64. The link 66 is configured to move or pivot the actuator arm 64 between a lock position and an unlock position about an axis that extends through the rake bolt 44 in response to operation of the electric motor 62. The link 66 pivots or moves the actuator arm 64 from the lock position towards the unlock position to facilitate adjustment of a position of the steering wheel connected to the upper jacket assembly 42. The cam release feature 70 is configured to engage a portion of the restriction assembly 24 to facilitate the adjustment of the steering wheel while the actuator arm 64 is moved between the lock position and unlock position.

The restriction assembly 24 is operatively connected to at least one of the mounting bracket 20 and the jacket assembly 22. The restriction assembly 24 is configured as an energy absorption assembly and a positive locking assembly for rake and telescope adjustment of the steering column assembly 10. The restriction assembly 24 is configured to lock the jacket assembly 22 in a fixed position about the pivot axis 12B and generate a drag force during a steering column collapse event along the steering column axis 12A. The restriction assembly 24 is also configured to inhibit movement of the upper jacket assembly 42 relative to the lower jacket assembly 40 and/or movement of the jacket assembly 22 relative to the mounting bracket 20 to maintain a position of the steering wheel stable for driving.

The restriction assembly 24 includes a first strap 80, a second strap 82, a bracket assembly 84, a cam member 86, a first biasing member 88, and a second biasing member 90.

Referring to FIGS. 1-4, the first strap 80 is configured as a preformed rack that is pivotally or rotatably connected to the first arm 32 of the mounting bracket 20. The first strap 80 is disposed generally transverse to the steering column axis 12. The first strap 80 is arranged to restrict or inhibit tilt, pitch, or rake adjustment of the jacket assembly 22 relative to the mounting bracket 20 while the adjustment lever 50 and/or the actuator arm 64 are in the lock position.

Figure 3:
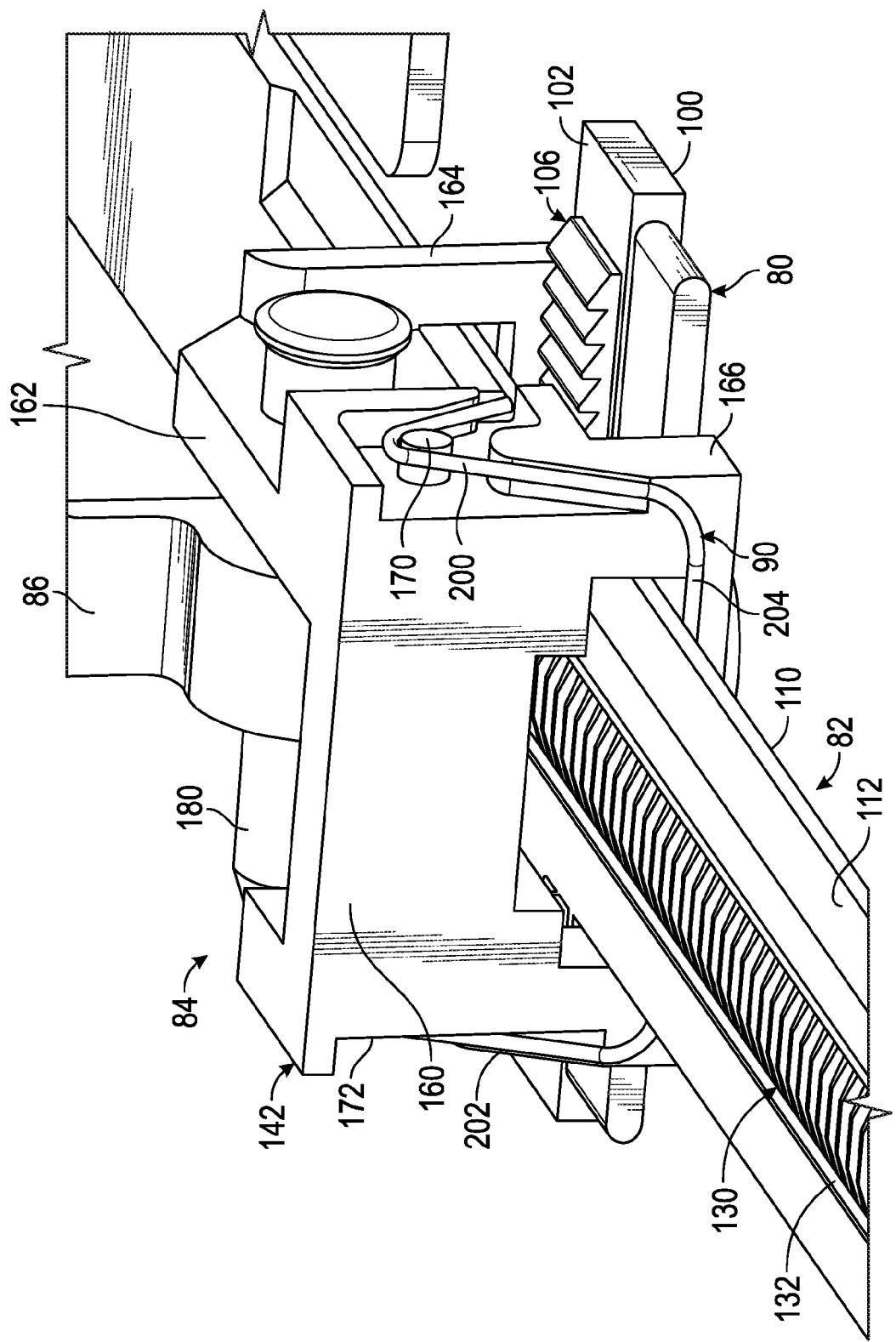
FIG. 3 is a partial perspective view of a portion of a restraint assembly.
Figure 4:
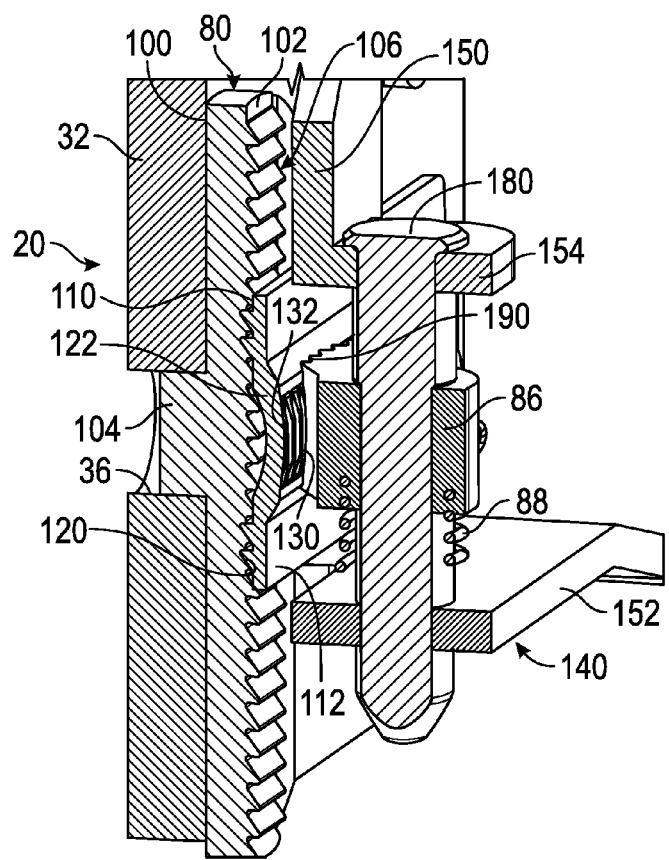
FIG. 4 is a partial cross-sectional view of the restraint assembly.
Figure 5:
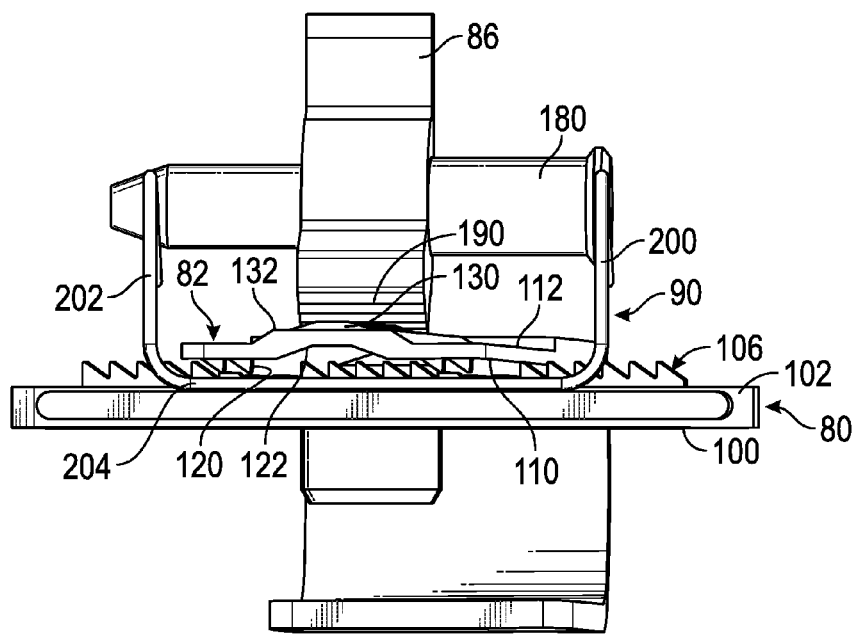
FIG. 5 is a partial perspective view of a portion of the restraint assembly.

Referring to FIGS. 3-5, the first strap 80 includes a first strap first surface 100 and a first strap second surface 102 disposed opposite the first strap first surface 100. The first strap first surface 100 faces towards the first arm 32 of the mounting bracket 20. The first strap first surface 100 includes a pivot 104. The pivot 104 extends from the first strap first surface 100 and extends into the first arm 32 of the mounting bracket 20. The pivot 104 is received within the opening 36 of the first arm 32. The pivot 104 is configured to enable the first strap 80 to pivot relative to the first arm 32 during a tilt, pitch, or rake adjustment of the jacket assembly 22 relative to the mounting bracket 20.

The first strap second surface 102 faces away from the first arm 32 of the mounting bracket 20. The first strap second surface 102 defines a plurality of first locking teeth 106. The plurality of first locking teeth 106 may be stamped, or otherwise formed into the first strap second surface 102 of the first strap 80. The plurality of first locking teeth 106 are provided with a first locking pattern such as a sawtooth pattern, a plurality of ridges, or the like.

The second strap 82 is disposed on or proximate the first arm 32 of the mounting bracket 20 and the jacket assembly 22. The second strap 82 is disposed generally parallel to the steering column axis 12 and is disposed generally transverse to the first strap 80. The second strap 82 is configured as an energy absorption strap that provides a drag load or force opposing stroking or translation of the upper jacket assembly 42 relative to the lower jacket assembly 40 along the steering column axis 12 to decelerate the steering column assembly 10 during a steering column collapse event. The second strap 82 extends between the mounting bracket 20 and at least one of the lower jacket assembly 40 and the upper jacket assembly 42 of the jacket assembly 22. The second strap 82 is also configured to engage the first strap 80 to inhibit tilt, pitch or rake adjustment of the jacket assembly 22 relative to the mounting bracket 20.

The second strap 82 includes a second strap first surface 110 and a second strap second surface 112 disposed opposite the second strap first surface 110. The second strap first surface 110 faces towards the first strap second surface 102.

The second strap first surface 110 defines a plurality of second locking teeth 120 that face towards the plurality of first locking teeth 106. The plurality of second locking teeth 120 may be arranged in two series that are separated from each other by a valley 122. In at least one embodiment, the valley 122 may not be provided. The plurality of second locking teeth 120 are arranged to selectively engage the plurality of first locking teeth 106. The plurality of second locking teeth 120 are provided with a second locking pattern that is complementary to the first locking pattern of the plurality of first locking teeth 106.

The second strap second surface 112 faces away from the first strap second surface 102. The second strap second surface 112 defines a plurality of third locking teeth 130 that are disposed opposite the plurality of second locking teeth 120. The plurality of third locking teeth 130 face away from the plurality of first locking teeth 106. The plurality of third locking teeth 130 are disposed on a ridge 132 that is disposed opposite the valley 122. The plurality of third locking teeth 130 are arranged perpendicularly to the plurality of second locking teeth 120 such that the plurality of third locking teeth 130 are disposed substantially transverse to the plurality of second locking teeth 120. The plurality of third locking teeth 130 are provided with a third locking pattern.

Referring to FIGS. 1-4, the bracket assembly 84 is disposed on at least one of the first arm 32 of the mounting bracket 20 and the jacket assembly 22. The bracket assembly 84 includes a first bracket 140 and the second bracket 142.

The first bracket 140 includes a mounting portion 150, a first wall 152, and a second wall 154. The mounting portion 150 is disposed on the first arm 32 of the mounting bracket 20. The first wall 152 extends from and is disposed substantially perpendicular to the mounting portion 150. The second wall 154 is spaced apart from and is disposed substantially parallel to the first wall 152. The second wall 154 extends from and is disposed substantially perpendicular to the mounting portion 150.

The second bracket 142 is disposed adjacent to the first bracket 140. The second bracket 142 includes a bracket body 160, a third wall 162, a first leg 164, and a second leg 166. The bracket body 160 is spaced apart from the first arm 32 of the mounting bracket 20 by the first leg 164 and the second leg 166. The bracket body 160 includes a first protrusion 170 and the second protrusion 172 disposed opposite the first protrusion 170. The first protrusion 170 and the second protrusion 172 extend from the bracket body 160 in opposite directions.

The third wall 162 extends from the bracket body 160 towards the first bracket 140. The third wall 162 is disposed between the first wall 152 and the second wall 154. The third wall 162 is disposed substantially parallel to the second wall 154. The third wall 162 abuts the second wall 154. A pin 180 extends through the first wall 152, the second wall 154, and the third wall 162 to operatively connect the first bracket 140 to the second bracket 142.

The first leg 164 and the second leg 166 extend from the bracket body 160 towards and engage the first arm 32 of the mounting bracket 20. The first leg 164 and the second leg 166 are disposed substantially perpendicular to the bracket body 160. The first leg 164 is spaced apart from and is disposed substantially parallel to the second leg 166. The first strap 80 is disposed between the first leg 164 and the second leg 166. The second strap 82 extends through openings that are formed in the first leg 164 and the second leg 166.

The cam member 86 is configured as an engagement cam that forces the plurality of second locking teeth 120 of the second strap 82 towards the plurality of first locking teeth 106 when the cam member 86 engages the second strap 82. The cam member 86 is disposed between and spaced apart from the first wall 152 and the third wall 162. The cam member 86 is disposed between the first wall 152 and the second wall 154. The cam member 86 is pivotally connected to at least one of the first bracket 140 and the second bracket 142 by the pin 180.

The cam member 86 is disposed about the pin 180. The cam member 86 is configured to pivot about the pin 180. The cam member 86 define a plurality of complementary engagement members 190 that are configured to selectively engage the plurality of third locking teeth 130 of the second strap 82.

As shown in FIG. 4, the plurality of complementary engagement members 190 engage the plurality of third locking teeth 130 of the second strap 82 while the cam release feature 52 of the adjustment lever 50 is spaced apart from the cam member 86 while the adjustment lever 50 is in the lock position. While the adjustment lever 50 is moving towards or is in the unlock position, the cam release feature 52 of the adjustment lever 50 engages the cam member 86 to pivot the cam member 86 such that the plurality of complementary engagement members 190 do not engage the plurality of third locking teeth 130 of the second strap 82.

As shown in FIG. 2, the plurality of complementary engagement members 190 engage the plurality of third locking teeth 130 of the second strap 82 while the cam release feature 70 of the actuator arm 64 is spaced apart from the cam member 86 while the actuator arm 64 is in the lock position. While the actuator arm 64 is moving towards or is in the unlock position, the cam release feature 52 of the adjustment lever 50 engages the cam member 86 such that the plurality of complementary engagement members 190 do not engage the plurality of third locking teeth 130 of the second strap 82.

The first biasing member 88 is disposed about the pin 180. The first biasing member 88 is at least partially disposed between the cam member 86 and the first wall 152 of the first bracket 140. The first biasing member 88 extends at least partially through the first wall 152 of the first bracket 140 to operatively connect the first biasing member 88 to the first wall 152. The first biasing member 88 engages the cam member 86.

Referring to FIGS. 1, 2, and 4, the first biasing member 88 is arranged to bias the plurality of complementary engagement members 190 of the cam member 86 towards engagement with the plurality of third locking teeth 130 of the second strap 82. The first biasing member 88 is further arranged to bias or apply a force to the cam member 86 such that the plurality of second locking teeth 120 are biased towards engagement with the plurality of first locking teeth 106. The plurality of second locking teeth 120 of the second strap 82 maintaining engagement with the plurality of first locking teeth 106 of the first strap 80 while the jacket assembly 22 is adjusted relative to the mounting bracket 20 due to the first strap 80 being pivotally connected to the first arm 32 of the mounting bracket 20.

The second biasing member 90 is operatively connected to the second bracket 142 and is disposed at least partially about the second strap 82. The second biasing member 90 includes a first connecting portion 200, a second connecting portion 202, and an engagement portion 204 extending between the first connecting portion 200 and the second connecting portion 202. The first connecting portion 200 is operatively connected to the first protrusion 170. The second connecting portion 202 is operatively connected to the second protrusion 172. The engagement portion 204 is configured to selectively engage the second strap first surface 110. The second biasing member 90 is arranged such that the engagement portion 204 biases the plurality of second locking teeth 120 away from engagement with the plurality of first locking teeth 106 while the plurality of complementary engagement members 190 are spaced apart from the plurality of third locking teeth 130.

The spacing apart of the plurality of complementary engagement members 190 of the cam member 86 from the plurality of third locking teeth 130 of the second strap 82 facilitates telescope adjustment of the upper jacket assembly 42 relative to the lower jacket assembly 40 along the steering column axis 12. The spacing apart or at least partial disengagement of the plurality of second locking teeth 120 of the second strap 82 from the plurality of first locking teeth 106 of the first strap 80 facilitates tilt, pivot, or rake adjustment of the jacket assembly 22 relative to the mounting bracket 20.

The engagement of the plurality of complementary engagement members 190 of the cam member 86 with the plurality of third locking teeth 130 of the second strap 82 and the subsequent engagement of the second locking teeth 120 of the second strap 82 with the plurality of first locking teeth 106 of the first strap 80 inhibits or restricts movement of the jacket assembly 22 relative to the mounting bracket 20 and inhibits or restricts movement of the upper jacket assembly 42 relative to the lower jacket assembly 40 along the steering column axis 12.

Throughout this specification, the term "attach," "attachment," "connected," "coupled," "coupling," "mount," or "mounting" shall be interpreted to mean that a structural component or element is in some manner connected to or contacts another element, either directly or indirectly through at least one intervening structural element, or is integrally formed with the other structural element.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly, comprising:
    a mounting bracket having a first arm and a second arm;
    a jacket assembly movable relative to a steering column axis, the jacket assembly being operatively connected to the first arm and the second arm; and
    a restriction assembly operatively connected to the jacket assembly and the mounting bracket, the restriction assembly being configured to inhibit movement of the jacket assembly relative to the mounting bracket, the restriction assembly comprising:
        a first strap mounted to the first arm, the first strap defining a plurality of first locking teeth,
        a second strap disposed on the first arm, the second strap defining a plurality of second locking teeth arranged to selectively engage the plurality of first locking teeth and defining a plurality of third locking teeth disposed opposite the plurality of second locking teeth,
        a first bracket disposed on the first arm, and
        a cam member pivotally connected to the first bracket, the cam member having a plurality of complementary engagement members configured to selectively engage the plurality of third locking teeth.

2. The steering column assembly of claim 1, wherein the first strap is disposed transverse to the steering column axis.

3. The steering column assembly of claim 1, wherein the second strap is disposed parallel to the steering column axis.

4. The steering column assembly of claim 1, further comprising a first biasing member that engages the cam member.

5. The steering column assembly of claim 4, wherein the first biasing member biases the plurality of complementary engagement members towards engagement with the plurality of third locking teeth and biases the plurality of second locking teeth towards engagement with the plurality of first locking teeth.

6. The steering column assembly of claim 5, further comprising a second bracket disposed on the first arm, the second bracket having a first leg and a second leg.

7. The steering column assembly of claim 6, wherein the first strap is disposed between the first leg and the second leg.

8. The steering column assembly of claim 7, wherein the second strap extends through the first leg and the second leg.

9. The steering column assembly of claim 8, further comprising a second biasing member operatively connected to the second bracket and configured to engage the second strap first surface.

10. The steering column assembly of claim 9, wherein the second biasing member biases the plurality of second locking teeth away from the plurality of first locking teeth.

11. A steering column assembly, comprising:
    a restriction assembly operatively connected to a jacket assembly and a mounting bracket operatively connected to the jacket assembly, the restriction assembly comprising:
        a first strap having a pivot extending into the mounting bracket and a plurality of first locking teeth, and
        a second strap disposed transverse to the first strap, the second strap having a plurality of second locking teeth that face towards the plurality of first locking teeth and a plurality of third locking teeth disposed opposite the plurality of second locking teeth.

12. The steering column assembly of claim 11, further comprising:
    a bracket assembly disposed on the mounting bracket, the bracket assembly including
        a first bracket having a first wall and a second wall, and
        a second bracket having a third wall, a first leg, and a second leg; and
    a pin extending through the first wall, the second wall, and the third wall.

13. The steering column assembly of claim 12, further comprising:
    a cam member disposed about the pin, the cam member having a plurality of complementary engagement members configured to selectively engage the plurality of third locking teeth.

14. The steering column assembly of claim 13, further comprising:
    a first biasing member disposed about the pin and arranged to bias the plurality of complementary engagement members towards engagement with the plurality of third locking teeth and bias the plurality of second locking teeth towards engagement with the plurality of first locking teeth.

15. The steering column assembly of claim 14, further comprising a second biasing member operatively connected to the second bracket and disposed at least partially about the second strap.

16. The steering column assembly of claim 15, wherein the second biasing member is arranged to bias the plurality of second locking teeth away from the plurality of first locking teeth.

17. The steering column assembly of claim 16, further comprising an adjustment lever pivotally connected to at least one of the mounting bracket and the jacket assembly, the adjustment lever having a cam release feature.

18. The steering column assembly of claim 17, wherein the cam release feature is arranged to selectively engage the cam member to pivot the cam about the pin to move the plurality of complementary engagement members away from engagement with the plurality of third locking teeth and facilitates the second biasing member to bias the plurality of second locking teeth away from the plurality of first locking teeth.

19. The steering column assembly of claim 18, further comprising a column release actuator assembly disposed on the jacket assembly, the column release actuator assembly including:
- an electric motor;
- an actuator arm pivotally connected to at least one of the mounting bracket and the jacket assembly, the actuator arm having a cam release feature; and
- a link extending between the electric motor and the actuator arm.

20. The steering column assembly of claim 19, wherein in response to operation of the electric motor, the link is arranged to pivot the actuator arm such that the cam release feature selectively engage the cam member to pivot the cam about the pin to move the plurality of complementary engagement members away from engagement with the plurality of third locking teeth and facilitates the second biasing member to bias the plurality of second locking teeth away from the plurality of first locking teeth.

\* \* \* \* \*